United States Patent [19]

Tomita

[11] Patent Number: 4,978,193
[45] Date of Patent: Dec. 18, 1990

[54] OPTICAL FIBER CONNECTOR WHICH PROVIDES A HIGH SIGNAL RETURN LOSS

[75] Inventor: Akira Tomita, Redwood City, Calif.

[73] Assignee: Raychem Corporation, Menlo Park, Calif.

[21] Appl. No.: 398,109

[22] Filed: Aug. 24, 1989

[51] Int. Cl.$^5$ .............................................. G02B 6/38
[52] U.S. Cl. ............................. 350/96.21; 350/96.15; 350/96.20
[58] Field of Search ............... 350/96.20, 96.21, 96.22, 350/96.15

[56] References Cited

U.S. PATENT DOCUMENTS

| | | | |
|---|---|---|---|
| 4,148,554 | 4/1979 | Magnusson et al. | 350/96.21 |
| 4,615,581 | 10/1986 | Morimoto | 350/96.21 |
| 4,747,652 | 5/1988 | Campbell et al. | 350/96.15 |
| 4,753,510 | 6/1988 | Sezerman | 350/96.21 |
| 4,787,700 | 11/1988 | Yin | 350/96.21 |
| 4,793,679 | 12/1988 | Toda et al. | 350/96.15 |

Primary Examiner—John D. Lee
Attorney, Agent, or Firm—Dennis E. Kovach; Herbert G. Burkard

[57] ABSTRACT

An optical fiber connector includes first and second optical fiber contacts each of which have an end face thereof which forms a small angle with a plane which is orthogonal to a longitudinal axis of optical fibers being aligned. The small angle is chosen such that substantially all of any reflected signal at the optical fiber interface will not be transmitted back to a source generating optical signals for the optical fibers so as to reduce interference at the optical fiber source. A material of a body of the optical fiber contacts is made of a material harder than that of the optical fibers being connected so as to substantially reduce an amount of skill and attention required in grinding an end face of the optical fiber after it is disposed within a bore of the optical fiber contact body so as to result in a craft friendly installation.

15 Claims, 3 Drawing Sheets

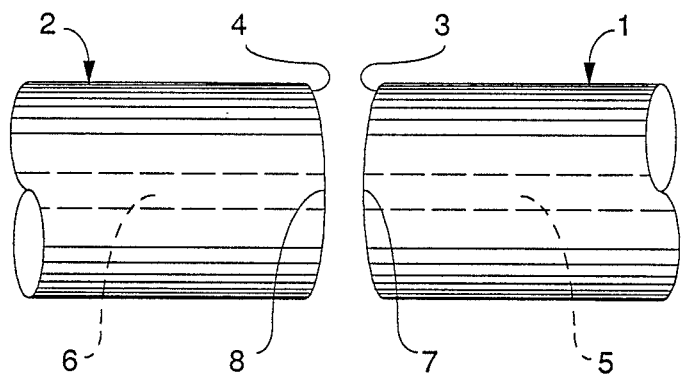
FIG_1
(PRIOR ART)

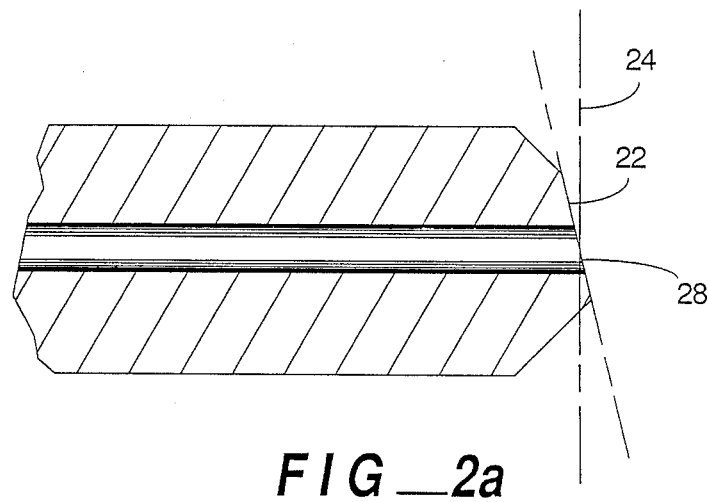
FIG__2a
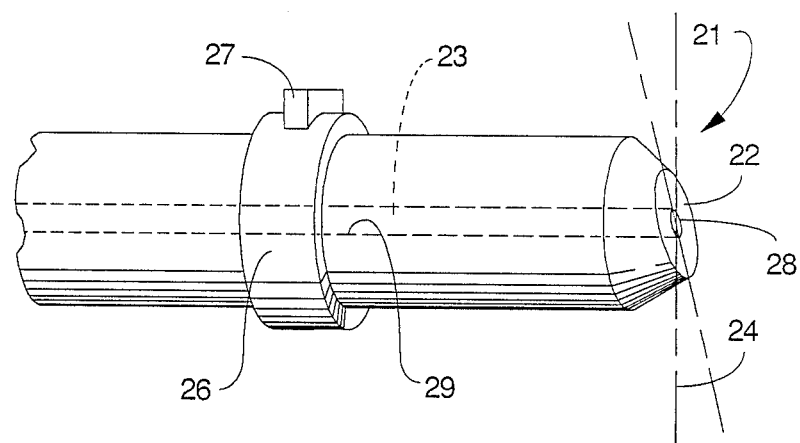
FIG__2b

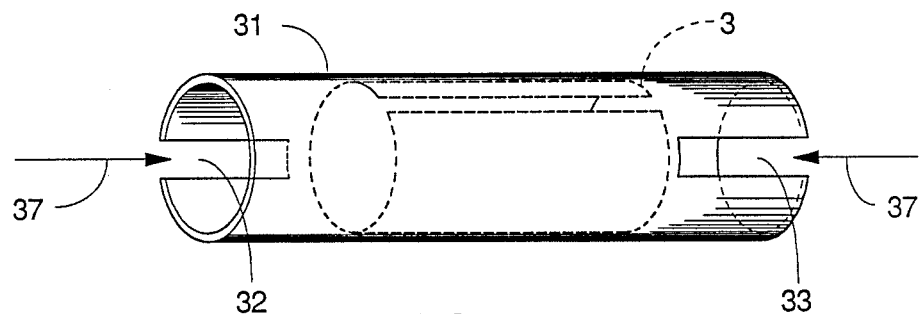
FIG_3
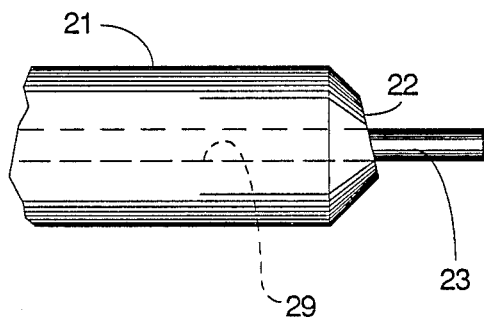
FIG_4
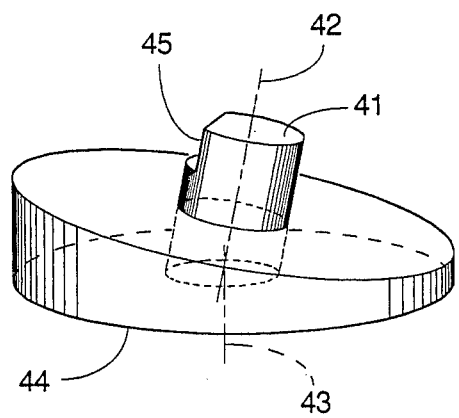
FIG_5

OPTICAL FIBER CONNECTOR WHICH PROVIDES A HIGH SIGNAL RETURN LOSS

FIELD OF THE INVENTION

The present invention relates to an optical fiber connector which is capable of providing a relatively high signal return loss and a relatively low transmission loss for an optical fiber connection.

BACKGROUND OF THE INVENTION

Optical fiber connections in optical fiber systems are generally required to have a relatively low signal loss thereat. These connectors used in high-speed single-mode fiber systems also require high return loss in order to avoid instability or noise in a light source which is caused by its reflected light. To this end, it is an accepted practice to polish ends of optical fibers to be connected so as to have planar or slightly convex surfaces which are substantially normal to longitudinal axes of the fibers, and urge the polished optical fiber ends together. One such prior art construction is illustrated in FIG. 1 wherein each optical fiber contact 1, 2 has a substantially convex end face 3, 4, with optical fibers 5, 6 being disposed within first and second longitudinal bores of the first and second contacts 1, 2 respectively. Various materials, e.g. ceramic, metal, glass, have been used for the optical fiber contact bodies in order to ensure that the substantially perpendicular ends 7, 8 of the first and second optical fibers can be formed at apexes of convex end faces 3, 4 by polishing to ensure an accurate mating gap-free interface therebetween. Though connectors utilizing such contacts do exhibit acceptable low loss connections and relatively high return loss, problems with such connectors include a craft sensitive fiber end polishing process and performance degradation caused by small dirt or dust particles between two contacting fiber end faces. Also due to the relatively high stress exerted on the fiber surfaces, these connectors may not function properly in harsh environments which experience high vibration or extreme temperaturs.

To alleviate this problem, a connector referred to by Radiall Corporation as an OPTABALL DF SERIES System has been proposed. This optical fiber contact includes a metal material which has a yet to be ground metal end face prior to fiber insertion in the contact. A glass optical fiber is then disposed within a bore of the optical fiber contact such that its end protrudes from the preground contact end face, and then the fiber end and the metal end face are polished and ground until the end of the fiber is coplanar with the ground and polished contact end face and slanted at an angle. The fiber end and the metal contact end face thus become substantially slanted relative to a longitudinal axis of the fiber, and hence back reflections at the connection are not transmitted to a signal light source generator since the back reflections have an initial angle of reverse propagation which exceeds a critical acceptance angle for the fiber. Though this solution does minimize a magnitude of signals reflected at the connection interface, in practice it is difficult to acccurately form the slanted end of the optical fiber and the metal contact end face conveniently, especially in field installation environments. Hence, this solution is not very craft friendly in practice.

SUMMARY OF THE INVENTION

It is an object of the invention to eliminate the above-noted drawbacks of the prior art and to provide an optical fiber connection which provides a relatively high signal return loss and which is user friendly to implement. A particular aspect of the invention is to provide a contact yet to be used in terminating an optical fiber which has an end face which is slanted and which is made of a material which is harder than that of the fiber so as to render a fiber polishing operation simple and craft friendly in the field.

This and other objects of the invention are achieved by an optical fiber contact, comprising:

an optical fiber including a glass core surrounded by a glass cladding;

an optical fiber contact having an end face which is substantially flat and which is inclined by several degrees from a plane orthogonal to a longitudinal axis of a portion of the fiber within the contact, the optical fiber portion being disposed within a longitudinal bore within the contact, the contact end face being made of a material having a hardness greater than that of the optical fiber, an end of the optical fiber being substantially coplanar with the contact end face, the inclination being an amount sufficient to significantly reduce a magnitude of a back reflected signal created when the contact is mated with another optical element.

BRIEF DESCRIPTION OF THE DRAWINGS

FIG. 1 illustrates prior art optical fiber contacts having mating convex end face profiles;

FIGS. 2a and 2b illustrates a first preferred embodiment of the invention and illustrates a preferred optical fiber contact;

FIG. 3 illustrates a preferred contact connector according to the invention;

FIG. 4 illustrates an interim assembly step of assembling a contact according to the invention; and FIG. 5 illustrates a preferred tool for polishing an end of an optical fiber terminated by a contact according to the invention.

DESCRIPTION OF THE PREFERRED EMBODIMENTS

FIGS. 2a and 2b illustrate a first preferred embodiment of the invention. Referring to these figures, an optical fiber contact 21 has an end face 22 which is substantially flat and which is inclined by several degrees relative to a longitudinal axis of a central longitudinal bore 29 which accommodates an optical fiber 23 therein. Preferably, the optical fiber includes a cylindrical glass core surrounded by a cylindrical glass cladding, the glass preferably comprising $SiO_2$, a material of a body of the optical fiber contact 21 being made of a material having a hardness greater than that of the optical fiber glass. Preferred materials comprise or consist essentially of ceramics. An angle of inclination of the end face 22 relative to a plane 24 which is normal to the bore longitudinal axis is preferably between 3° and 12°, more preferably between 5° and 10°, e.g. 8°, the precise angle to be used being governed by several design considerations, one of which is the minimum angle required so that substantially all reflected ligh from an end 28 of the fiber exceeds a critical acceptance angle of the fiber so that the refected light is not guided by the fiber core in a back reflection direction but is rather refracted into the fiber cladding and dissipated thereby.

The contact body 21 further includes a cylindrical ring 26 therearound which has a keying tab 27 formed thereon so as to allow the contact to be later correctly oriented into an optical fiber connector.

A preferred optical fiber connector is illustrated in FIG. 3 the connector 31 including a substantially cylindrical hollow body having first and second keying slots 32, 33 formed on opposite sides and ends of the body. The connector further includes a split sleeve 36 therein.

In operation, first and second contacts as illustrated in FIG. 2 are disposed in opposite ends of the optical fiber connector 31 such that the keying tabs 27 thereof mate with the respective keying slots 32, 33, with the contacts being held together in a collinear axially aligned relationship by a resilience of the split sleeve 36. Preferably, means 37 for spring biasing the contact end faces against one another is also provided. Also, it is preferred to dispose a small amount of gel between the fiber ends being mated, a preferred gel comprising a relatively soft elastic transparent index matching material. A preferred method of applying such a gel to a fiber contact is disclosed in abandoned U.S. patent application Ser. No. 942,667, filed Dec. 17, 1986, and assigned to the assignee of the present invention, the disclosure of which is incorporated herein by referance.

According to a preferred embodiment, the ceramic contact body 21 is formed in a factory where precise manufacturing tolerances can be maintained so as to have the accurately formed slanted end face 22 thereon and a hollow bore therethrough for later accommodating an optical fiber. Such contacts can then be stored indefinitely by a craftsman. When an optical fiber connection in a network is desired, the craftsman simply takes the preformed connector body, longitudinally disposes an optical fiber through the bore of the optical fiber contact so that an end of the optical fiber protrudes from an end of the contact end face 22 as illustrated in FIG. 4, and then secures the optical fiber within the bore of the optical fiber contact. Thereafter, the optical fiber contact is disposed in a tool such as that illustrated in FIG. 5, and specifically within a substantially cylindrical receiving cavity 41 thereof, the cavity 41 having a central longitudinal axis 42 which forms a predetermined angle with a normal 43 of a tool flat surface 44 at which the end of the cavity 41 terminates. Preferably, the angle between the normal 43 and the axis 42 is the same as the angle between the orthogonal plane 24 and a plane of the contact end face 22 shown in FIG. 2. The tool is then disposed against a grinding surface, such as a grinding and polishing paper, and the protruding portion of the optical fiber illustrated in FIG. 4 is ground away until it is flush with the contact end face 22 and polished. Optionally, a gel is then applied to the fiber end as described in the copending application referred to above.

Since the keying tab 27 of the contact 21 is disposed within a keying slot 45 of the material forming the cavity 41, the polished optical fiber end face is substantially coplanar with the contact end face 22. In addition, since the material of the contact body 21 is harder than that of the optical fiber, a precise shape of the end face 22 is not at all adversely affected by the grinding operation which allows a relatively unskilled craftsman to perform the grinding operation in a relatively uncontrolled manner quickly and yet create an optical fiber contact having an end face having a very accurately controlled surface characteristic. Accordingly, when any two such contacts are mated such as in a connector as illustrated in FIG. 3, a minimum separation distance between ends of the optical fiber result which reduces transmission losses at the optical fiber connection, and yet results in a relatively high signal return loss due to the slanted orientation of the ends of the optical fiber. In contrast, with prior art contacts which have slanted end faces, since the grinding operation is required to grind the contact end face, great care is needed in the grinding operation. On the other hand, according to the invention, since the contact body 21 is made of a material harder than the optical fiber, little craft sensitivity and attention is needed during the grinding operation, especially when a tool such as that illustrated in FIG. 5 is utilized.

Though the invention has been described by reference to certain preferred embodiments thereof, it should be understood that the invention is not to be limited thereby and only by the appended claims.

We claim:

1. An optical fiber contact assembly, comprising:
    an optical fiber including a glass core surrounded by a glass cladding;
    an optical fiber contact having an end face which is substantially flat and which is inclined by several degrees from a plane orthogonal to a longitudinal axis of a portion of the fiber within the contact, the optical fiber portion being disposed within a longitudinal bore within the contact, the contact end face being made of a material having a hardness greater than that of the optical fiber, an end of the optical fiber being substantially coplanar with the contact end face, the inclination being an amount sufficient to significantly reduce a magnitude of a back reflected signal created when the contact is mated with another optical element.

2. The assembly of claim 1, further comprising a keying tab disposed on an outer surface of the contact for appropriately orienting the contact within an optical fiber contact connector.

3. The assembly of claim 1, further comprising a relatively soft elastic transparent index matching material disposed in contact with the optical fiber end.

4. The assembly of claim 1, the optical fiber end being inclined by an angle which is between 3° and 12° from the orthogonal plane.

5. An optical fiber connector, comprising:
    first and second optical fiber contacts, the contacts including respective first and second optical fibers each of which includes a glass core surrounded by a glass cladding, the contacts including first and second respective end faces which are substantially flat and which are inclined by several degrees from a plane orthogonal to a longitudinal axis of the first and second optical fibers respectively, each end face being made of a material having a hardness which is greater than that of each optical fiber, ends of the fibers being substantially coplanar with their respective contact end face, each optical fiber being disposed within a longitudinal bore within its respective contact;
    means for aligning and holding the contacts such that the respective optical fiber ends are in an opposing confronting attitude.

6. The connector of claim 5, the aligning means including first and second asymmetric slots, the first and second optical fiber contacts including first and second keying tabs disposed on a respective outer surface of the first and second contacts, the first and second tabs being registrable with the first and second slots, respectively.

7. The connector of claim 6, the first and second contacts having a substantially identical construction, the asymmetric slots being offset by approximately 180°.

8. The connector of claim 7, further comprising means for spring biasing the contact end faces together.

9. The connector of claim 7, further comprising a soft elastic transparent index matching material disposed in contact with the first and second fiber ends.

10. A method of making an optical fiber contact, comprising the steps of:
   forming a substantially cylindrical body so as to have a longitudinal bore therethrough for receiving an optical fiber having a glass core and a glass cladding, the body being made of a material having a hardness greater than that of the optical fiber;
   first grinding an end face of the cylindrical body so as to be substantially flat and inclined relative to a longitudinal axis of the bore by several degrees;
   disposing and securing the optical fiber within the bore subsequent to first grinding the body end face such that the fiber protrudes beyond the body end face;
   second grinding a protruding end of the optical fiber so as to be polished and substantially coplanar with the body end face.

11. The method of claim 10, the forming and first grinding steps being done during a controlled manufacturing process, the disposing and securing and second grinding steps being done during an optical fiber field connection procedure.

12. The method of claim 10, the end face being inclined by an angle between 3° and 12°.

13. The method of claim 10, further comprising the step of forming a keying tab on an outer surface of the body for properly orienting the contact with a connector.

14. The method of claim 10, the first grinding step being done by disposing the cylindrical body in a substantially cylindrical receiving cavity formed within a grinding tool, a central longitudinal axis of the cavity being inclined by several degrees relative to a normal of a flat surface of the tool at which the cavity terminates, the optical fiber end face protruding from the body end face prior to the second grinding step, the flat surface of the tool being urged against a grinding surface so as to grind and polish the protruding optical fiber end.

15. The method of claim 14, the tool having a keying slot registrable with a keying tab formed on the body.

* * * * *